UNITED STATES PATENT OFFICE 2,498,165

PROCESS FOR PRODUCING BACITRACIN

Balbina A. Johnson, Scarsdale, and Frank L. Meleney, New York, N. Y., assignors to the United States of America as represented by the Secretary of War No Drawing. Application May 29, 1946, Serial No. 673,162

11 Claims. (Cl. 195—96)

This invention relates to antibiotic and process for producing same.

In the study of bacterial flora of contaminated wounds it was found that at times organisms appeared on blood agar plates following direct plating of the injured tissues that were not recovered from broth cultures made at the same time and from the same material. Upon further study it appeared that this occurred most frequently when the broth cultures contained a large number of aerobic Gram-positive sporulating rods. It was from this phenomenon that the investigation leading to the discovery of the subject matter of this invention was instigated. After testing all aerobic sporogenic bacilli isolated from contaminated wound cultures, a particularly antagonistic strain was isolated and cultivated. This particular strain produces a very strong antibacterial effect against a large number of bacterial strains. The active agent was obtained not only in the broth culture of this organism but also in the cell-free filtrate of the broth.

The active ingredient was extracted from the culture medium, concentrated and tested for antibacterial properties and irritation to human tissues.

In order to more fully and specifically describe the invention, the various steps of process for obtaining the antibiotic will be set forth hereinbelow in detail.

Discovery and isolation of the strain

The debrided tissue surgically removed from a contaminated compound fracture of the tibia was mixed with a buffered broth to distribute bacteria evenly through the broth. A portion of the bacterial suspension was then planted on each of two blood agar plates and each of two large test tubes containing 40 cc. of cooked meat medium and into a smaller tube containing 10 cc. of iron milk. One plate and one test tube of cooked meat medium and the iron milk tube were then incubated aerobically and the other plate and test tube were placed in an anaerobic jar for anaerobic cultivation. The incubation and cultivation were continued for 24 hours, after which time the cultures were examined and from the cooked meat medium transplants on blood agar plates, 4 different strains of Gram-positive sporulating bacilli were recovered. The only other species recovered was a green streptoccus. Upon testing the four recovered strains for antagonistic action upon Gram-positive organisms, one strain was found to be extremely antagonistic. The strain upon isolation and identification proved to be of the B. subtilis group. It is a Gram-positive aerobic sporogenic bacillus. The rods are slender and in liquid media are single, in pairs or in short chains. The spores which do not bulge the rods are central to sub-terminal. This particular strain has been designated as "Tracy I," American Type Culture Collection No. 10,716.

Production, recovery and concentration of the active agent

When cell-free filtrates of broth cultures of this bacillus were found to possess a strong antibiotic activity and to be non-toxic, further investigation was conducted to obtain high concentrations of this active agent or antibiotic. This active agent or antibiotic has been designated "Bacitracin." The antibiotic is produced in cultures on solid and in liquid medium. It diffuses through blood meat infusion and plain agar. It is formed in tryptone broth, meat infusion broth, savita broth, Brewer's soy bean medium, and in synthetic mediums. One of the synthetic mediums found to produce the antibiotic in adequate quantity is of the following formula in which the ingredients by weight are listed to form a final concentration in one liter of distilled water:

Glucose, 10 gms.
1-glutamic acid, 5 gms.
$KH_2PO_4$, 0.5 gm.
$K_2HPO_4$, 0.5 gm.
$MgSO_4\text{-}7H_2O$, 0.2 gm.
$MnSO_4\text{-}4H_2O$, 0.01 gm.
NaCl, 0.01 gm.
$FeSO_4\text{-}7H_2O$, 0.01 gm.
$CuSO_4\text{-}5H_2O$, 0.01 gm.
$CaH_4(PO_4)_2$, 2 ml. saturated solution.

Sucrose, lactose and laevulose may be substituted as the carbohydrate ingredient for dextrose in the above medium. The copper salt does not appear to increase the titer but the highest titers were obtained more consistently when it was used.

Tests have indicated that the antibiotic is produced in acid and mildly alkaline solutions. Optimum results are obtained, however, when the medium is substantially neutral and sterilized in flowing steam after distribution into flasks to prevent caramelization of the glucose. Likewise it has been found advantageous to grow the strain in shallow layers. Accordingly, if one liter capacity Erlenmeyer flasks or Blake bottles be used, no more than 250 ml. should be employed per flask or bottle. Approximately the same depth level should be maintained when growing the culture in shallow vats. Although the optimum conditions for the production of "Bacitracin" in various culture media are still being investigated, it appears from the information available at present that the highest titers are obtained if the culture is harvested after 3 to 5 days incubation at 37° C. The time of harvesting is determined by the pH of the culture. The pH of the growing culture falls to 5.5 to 6 during the first 48 hours of incubation, and then becomes alkaline. It would appear that the antibiotic is produced at the acid pH's and continues to increase in titer until the pH reaches 7.2–7.3. If incubation is continued the pH reaches an alkalinity of 8–8.2, but as the alkalinity increases, the pellicle begins to autolyze and the titer of the antibiotic in the culture medium drops. The culture should be harvested, therefore, when the pH of the medium is approximately 7.2. The antibiotic is harvested by pouring off or decanting the culture fluid leaving the pellicle behind. Although it is not necessary, it is desirable to filter the culture fluid through a suitable material such as fine mesh gauze, glass wool or "Standard Supercel."

The active agent, "Bacitracin," is extracted from the culture medium with a suitable solvent. An efficient extraction medium has been found to be one part of n-butanol to two parts of harvested culture by volume. Two extractions are made using this solution and the extract is then filtered. Filter paper has been found satisfactory for this purpose. The filtrate is then concentrated, preferably by steam distillation in vacuo. It has been found necessary to add water to the butanol extract to hasten the speed as well as lower the temperature of the distillation. The addition of the water is so regulated that all of the butanol distills over and the residual water solution amounts to $1/50$ to $1/100$ of the volume of the original culture medium. This ratio of water to alcohol may be stated generally when fed into the still, as having two parts butyl alcohol to one part distilled water. This concentrate in water solution may be used in this form, or it may be further purified and precipitated.

The antibiotic concentrate may be further purified and concentrated by extraction, with a suitable solution, to remove fatty material, and by distillation. To accomplish this, the water solution concentrate is extracted with an equal volume of chloroform and the chloroform solution discarded. The residual solution may then be extracted several times, three usually being adequate, with half its volume of n-butanol, and the combined extracts distilled in vacuo as outlined above until the remaining water solution comprises approximately $1/100$ of the volume of the original culture medium. It should be noted at this point that the temperature of both of the distillations as described hereinabove should not exceed 25° C. to obtain an antibiotic of high activity. The antibiotic in aqueous solution has been found, however, to withstand heating to 100° C. for approximately 15 minutes without a significant loss of titer.

If desired, the concentrate solution may be further purified after the chloroform extraction, described above, by acidification to congo paper with hydrochloric acid. The acidified solution is extracted twice with chloroform and then twice with a mixture containing approximately 20% chloroform and 80% butanol, then several times with a mixture of approximately 10% chloroform and 90% butanol until the extracts obtained are practically colorless. All of these combined extractions remove less than 10% of the active material from the aqueous layer. The active solution may then be treated with salt until the solution is 10% with respect to sodium chloride and extracted twice with butanol. The butanol extracts may then be combined and reextracted with water. The aqueous concentrate should be neutralized with sodium bicarbonate.

Further purification and distillation of these concentrates yield a grayish white powder which possesses the antibiotic effectiveness.

The following additional methods for purification and further concentration of the aqueous concentrate of the butanol extract may be employed.

*Method I.*—To the aqueous residue remaining after concentration of the butanol extract of the harvest, an equal volume of butanol-ether solution (50 per cent butanol and 50 per cent peroxide-free ether) is added. The mixture is shaken in a separatory funnel. Concentrated hydrochloric acid is added drop by drop until the mixture layers immediately after shaking. The upper layer becomes darker when the acid is added due to the removal of impurities from the aqueous layer. The end-point for the acidification process is determined with congo paper. The lower aqueous layer should turn the paper blue. The lower layer which contains the active material is drawn off and the extraction with butanol-ether solution is repeated. The mixture is allowed to stand for 10 minutes, and the lower layer is again drawn off and then extracted 5 times with peroxide-free ether, using one half the volume of the original concentrate for each extraction. The final aqueous layer is then distilled under reduced pressure until all butanol and ether have been removed. After distillation, the solution should be neutralized with sodium bicarbonate. If all the butanol and ether have been removed, the material is suitable for clinical and experimental use. Such solutions may also be lyophilized and then reconstituted in distilled water to give the desired concentration of "Bacitracin."

*Method II.*—The aqueous solution of the concentrated harvest, free of butanol, is cooled to 0–3° C. and made 0.3 normal with hydrochloric acid. Cold 2 normal hydrochloric acid is used for the acidification. Fatty-acids, some neutral fat and pigmented substances separate. The mixture is left in the refrigerator overnight for the globules to coalesce and settle on the walls of the vessel. The next day the solution is siphoned off cold. Elevation of the temperature increases the solubility of these substances. A possible modification in this step is the use of a refrigerated centrifuge to separate the precipitated material. This would eliminate the need for overnight settling. All batches of the antibiotic were found to be stable to this treatment. The solution partially purified by the above process is extracted 5 times with benzene. One-half volume of benzene for one volume of aqueous solution is used in each extraction. There is a clean rapid separation of the two phases. The aqueous layer remains slightly milky throughout the five extractions, but becomes clear after it has been separated from the last extract and exposed to the air for a short time. Although the recovery of the antibiotic may be as high as 90 per cent, at times this benzene extraction step has resulted in considerable loss of active material.

Concentrates obtained by the above methods may be used in their concentrated form or the active agent may be precipitated and recovered therefrom.

Precipitation of the active agent

On lyophilizing the water solution concentrates a slightly yellowish powder is obtained. It was found that Reinecke's salt, phosphotungstic acid, phosphomolybdic acid, molybdic acid, picric acid and ammonium rhodanilate precipitated the active agent completely. The precipitates were centrifuged and washed and then dissolved in a mixture of 0.1% aqueous hydrochloric acid and an equal volume of butanol and ether. After separation, the active agent was found in the aqueous layer. The material obtained from the aqueous layer after evaporation of the solvents showed no decrease in activity with respect to its dry weight when compared with the unprecipitated samples. Of all the precipitants tried, however, azobenzene p-sulfonic acid was found to precipitate substantially all of the active agent from the concentrated butanol extract without damaging its activity. All of the active agent can be recovered from the precipitate by redissolving the precipitate in aqueous butanol and extracting with 1% hydrochloric acid in water. The reagent excess can then be removed by extraction with a solution containing an equal volume of butanol and ether. The precipitate obtained with this precipitant was found to contain substantially all of the active agent with negligible amounts of impurities.

The effective agent, "Bacitracin," is apparently a neutral substance not precipitable from the original harvest by manipulating the pH. It cannot be extracted by ether, chloroform, acetone or ethyl acetate. It is water and lower alcohol soluble and withstands heating for 15 minutes at 100° C. without a significant loss of titer. It is stable in acid solutions but unstable in alkaline solutions above pH 9. It is not destroyed by peptic or tryptic ferments, which indicates that it may administered orally. The cell-free filtrates of the original culture medium have retained their potency for over 7 months' storage at 5° C. and a concentrate in water solution has retained potency for 5 months at 5° C. The active agent, "Bacitracin," is not removed from the original culture mediums or from concentrates in water solution by filtration through Berkefeld, Chamberland, Coors, or Selas filter candles. It does not hemolyze human red blood cells in saline suspension. It is stable to 1 normal hydrochloric acid at 5° C. but not at 37° C. It is stable to $1/100$ normal hydrochloric acid at 5° and 37° C. It is unstable in alkaline solution above pH 9 at both temperatures.

Standardization and tests

A standard unit for assaying potency has not been established. A provisional unit has been employed for convenience which designates as one unit the amount which when diluted 1:1024 in a series of two-fold dilutions in 2 cc. of beef infusion broth, completely inhibits the growth of a stock strain of group A hemolytic streptococcus when the inoculum used to see the tubes is 0.1 cc. of a $10^{-2}$ dilution of an overnight culture in blood broth. The harvest from synthetic medium when extracted and concentrated to $1/100$ the volume of the original culture has been found to assay as high as 400 units per cc. of concentrate.

The following table gives the dilutions of one unit which resulted in complete bacteriostasis of some of the organisms which have been tested under suitable experimental conditions:

Bacteriostatic action of "Bacitracin"

| Organisms | Dilutions of 1 unit giving complete bacteriostasis |
|---|---|
| B. hem. streptococcus: | |
| Groups A, B, C, G | 512–1024 |
| Group D | 16–64 |
| Nonhemolytic streptococcus | 0–64 |
| Pneumococcus: Types I, II and III | 512–1024 |
| Staphylococcus aureus | 16–64 |
| Other Gram-positive micrococci | 16–256 |
| C. welchii | 512–768 |
| C. septicum | 512 |
| C. sordellii | 512 |
| C. histolyticum | 128 |
| C. sporogenes | 256 |

"Bacitracin" has been found to have an invitro inhibitory action in the broth on the gonococcus and meningococcus. "Bacitracin" is not activated by organisms of the E. coli, and Ps. pyocyanea groups or the staphylococci and micrococci which produce "penicillinase" and therefore frequently destroy penicillin. The in vivo protective action of "Bacitracin" has been tested in guinea pigs, rabbits, mice, and human beings.

When mice were injected intraperitoneally with 10,000 M. L. D. of an overnight culture of hemolytic streptococcus in blood broth, followed immediately by an intraperitoneal injection of 1 to 2 units of "Bacitracin," in the cell-free filtrate of the antibiotic as harvested and centrifuged, approximately 80% of the mice survived. When mice injected as above and followed immediately by a subcutaneous injection of one or two units of "Bacitracin," in cell-free filtrate, approximately 40% of the mice survived. If, however, the mice so injected received additional doses of one to two units subcutaneously every three hours for 36 hours, 90% of them survived.

Guinea pigs have been protected against the development of gas gangrene when 1 cc. and 0.5 cc. of an overnight culture of C. welchii or C. septicum combined immediately before injection with 50 to 100 units of "Bacitracin" in 1 cc. of distilled water, was injected into the thigh muscle. These pigs received additional doses of 50 to 100 units of "Bacitracin" subcutaneously every three hours for 36 hours. The control pigs injected with a like inoculum of organisms all died within 12 hours. Some swelling and oedema developed at the site injection of the gas gangrene organisms, but in 80% of the pigs this gradually receded and the pigs were alive and well two weeks after the injection. There was no sign of local toxicity from the subcutaneous injection of "Bacitracin" nor was there any general toxic reaction in the experimental pigs or the antibiotic controls.

Cell-free filtrates and concentrates in water solution, approximately 50 times the potency of the original culture medium, are non-toxic. There was no evidence of a toxic reaction when 5 cc. (500 units) of the concentrate in water solution was injected, intravenously into rabbits on each of seven successive days, or when 1 cc. (100 units) was injected intraperitoneally into mice on each of twenty-one successive days.

"Bacitracin" in cell-free filtrates and concentrates in water solution have been satisfactorily used locally to treat human infections due to hemolytic streptococcus and staphylococcus. Local injections have promptly resolved furuncles, carbuncles, infected sebaceous cysts, subcutaneous abscesses, and styes. There have been no signs of local irritation when the preparations were applied locally to human infection or injected subcutaneously. It has caused no irritation of the conjunctiva. Blood levels have been obtained following human subcutaneous injections.

Intramuscular injections of 400 units of concentrates in water solution ($1/_{.00}$ volume) have not shown any signs or symptoms of ill effects. Following human intramuscular injections of a thousand units of concentrate in water solution ($1/_{100}$ volume), a blood level of .002 unit per cc. has been determined a half hour later, whereas none was found an hour after injection. When rabbits were injected intramuscularly with 500 to 1000 units of "Bacitracin" in aqueous solution, blood levels of 0.25 to 0.5 unit per cc. of serum were obtained one-half, one and two hours after the intramuscular injection. Five hours after injection the blood level had dropped to 0.004 unit per cc., i. e., one part of serum in three parts of beef infusion broth completely inhibited the growth of the hemolytic streptococcus under the standard assay conditions.

Having thus described our invention, what we claim as new and wish to secure by Letters Patent is:

1. A process for preparing Bacitracin precipitates comprising cultivating B. subtilis Tracy I in a culture medium, extracting the antibiotic from said resulting medium with a low molecular weight alcohol, concentrating the alcohol extract in vacuo in the presence of water, acidifying the concentrate and extracting with a mixture of chloroform and butanol, and precipitating the antibiotic from said resulting solution with a precipitating agent selected from the group consisting of Reinecke's salt, phosphotungstic acid, phosphomolybdic acid, molybdic acid, picric acid, ammonium rhodanilate, and azobenzene-p-sulfonic acid.

2. A process for preparing Bacitracin comprising cultivating the B. subtilis Tracy I in a nutritive medium.

3. A process for preparing Bacitracin comprising cultivating the B. subtilis Tracy I in a nutritive medium, at pH 7.

4. A process for preparing Bacitracin comprising cultivating B. subtilis Tracy I in a neutral nutritive medium, extracting the antibiotic from said resulting medium with a low molecular weight alcohol, concentrating the alcohol extract in vacuo in the presence of water, extracting the concentrate with chloroform, and extracting the residual solution with butanol, and concentrating the butanol solution in the presence of water to a volume substantially one-hundredth the volume of the original culture medium.

5. A process for preparing Bacitracin, comprising cultivating B. subtilis Tracy I in a nutritive medium for more than three days at a temperature of substantially 37° C.

6. A process for preparing Bacitracin, comprising cultivating B. subtilis Tracy I in a nutritive medium for more than three days.

7. A process for preparing Bacitracin, comprising cultivating B. subtilis Tracy I in a nutritive medium, extracting the resulting antibiotic from the resulting medium with an extracting agent selected from the group consisting of water and the lower alcohols, and precipitating the antibiotic by addition to the resulting extract of a precipitating agent for the antibiotic, selected from the group consisting of Reinecke's salt, phosphotungstic acid, phosphomolybdic acid, molybdic acid, picric acid, ammonium rhodanilate, and azobenzene-p-sulfonic acid.

8. A process for preparing Bacitracin, comprising cultivating B. subtilis Tracy I in a nutritive medium, extracting the resulting antibiotic from the resulting medium with an extracting agent selected from the group consisting of water and the lower alcohols, acidifying the resulting antibiotic extract, and precipitating the antibiotic from the extract by adding to the extract a precipitating agent for the antibiotic, selected from the group consisting of Reinecke's salt, phosphotungstic acid, phosphomolybdic acid, molybdic acid, picric acid, ammonium rhodanilate, and azobenzene-p-sulfonic acid.

9. A process for preparing Bacitracin, comprising cultivating B. subtilis Tracy I in a nutritive medium at substantially pH 7, extracting the resulting antibiotic from the resulting medium with an extracting agent selected from the group consisting of water and the lower alcohols, acidifying the resulting antibiotic extract, and precipitating the antibiotic from the extract by adding a precipitating agent for the antibiotic thereto, selected from the group consisting of Reinecke's salt, phosphotungstic acid, phosphomolybdic acid, molybdic acid, picric acid, ammonium rhodanilate, and azobenzene-p-sulfonic acid.

10. A process for preparing Bacitracin, comprising cultivating B. subtilis Tracy I in a nutritive medium at substantially pH 7 and for more than three days, extracting the resulting antibiotic from the resulting medium with an alcohol, concentrating the resulting alcoholic extract of the antibiotic, acidifying the resulting concentrate and precipitating the antibiotic from the resulting solution with a precipitating agent for the antibiotic, selected from the group consisting of Reinecke's salt, phosphotungstic acid, phosphomolybdic acid, molybdic acid, picric acid, ammonium rhodanilate, and azobenzene-p-sulfonic acid.

11. A process for preparing Bacitracin, comprising cultivating B. subtilis Tracy I in a nutritive medium, at substantially pH 7 and 37° C., for more than three days, extracting the antibiotic from the resulting medium with a low molecular weight alcohol, concentrating the resulting alcoholic solution in vacuo, acidifying the resulting concentrate, extracting the antibiotic from the resulting solution, and precipitating the antibiotic from the resulting solution with a precipitating agent for the antibiotic, selected from the group consisting of Reinecke's salt, phosphotungstic acid, phosphomolybdic acid, molybdic acid, picric acid, ammonium rhodanilate, and azobenzene-p-sulfonic acid.

BALBINA A. JOHNSON.
FRANK L. MELENEY.

REFERENCES CITED

The following references are of record in the file of this patent:

Fried et al., Science, vol. 101, pages 613–615 (1945). Johnson, B. A., Anker H. and Meleney, F. L., "Bacitracin," a new antibiotic produced by a member of the B. Subtilis group. Science, 102· 376–377, Oct. 1945